(12) United States Patent
Riley et al.

(10) Patent No.: US 7,127,257 B2
(45) Date of Patent: Oct. 24, 2006

(54) USE OF MOBILE STATIONS FOR DETERMINATION OF BASE STATION LOCATION PARAMETERS IN A WIRELESS MOBILE COMMUNICATION SYSTEM

(75) Inventors: Wyatt Riley, Fremont, CA (US); Richard Girerd, Mountain View, CA (US); Zoltan Biacs, San Mateo, CA (US)

(73) Assignee: Qualcomm Incorporated, San Diego, CA (US)

( * ) Notice: Subject to any disclaimer, the term of this patent is extended or adjusted under 35 U.S.C. 154(b) by 506 days.

(21) Appl. No.: 10/097,041

(22) Filed: Mar. 12, 2002

(65) Prior Publication Data

US 2003/0125046 A1    Jul. 3, 2003

Related U.S. Application Data

(60) Provisional application No. 60/343,748, filed on Dec. 27, 2001.

(51) Int. Cl.
*H04Q 7/20* (2006.01)

(52) U.S. Cl. .................. 455/456.1; 455/456.2; 455/456.5; 455/456.6; 455/422.1; 455/414.1; 455/414.2; 455/561

(58) Field of Classification Search ............ 455/456.1, 455/456.2, 456.3, 456.4, 456.5, 456.6, 457, 455/414.1, 414.2, 404.1, 404.2, 426.1, 432.1, 455/550.1, 500, 517, 561, 524, 525, 446, 455/423, 424, 425, 445
See application file for complete search history.

(56) References Cited

U.S. PATENT DOCUMENTS

| 6,128,501 | A | * | 10/2000 | Ffoulkes-Jones | ......... 455/456.3 |
| 6,167,275 | A | * | 12/2000 | Oros et al. | ............... 455/456.2 |
| 6,445,927 | B1 | * | 9/2002 | King et al. | .............. 455/456.6 |
| 2002/0022482 | A1 | * | 2/2002 | Ishikawa | .................... 455/434 |
| 2003/0195008 | A1 | * | 10/2003 | Mohi et al. | .............. 455/456.5 |

* cited by examiner

*Primary Examiner*—Keith Furguson
(74) *Attorney, Agent, or Firm*—Philip Wadsworth; Bruce W. Greenhaus; Andrea L. Mays (57) ABSTRACT

In a wireless communication network, base station antenna positions and time offsets are stored in a base station almanac data base along with other information used for obtaining the most reliable mobile station position fixes under a variety of conditions. The system uses the position fixes of mobile stations and terrestrial ranging information to determine base station antenna positions and base station timing offsets. The base station antenna positions are determined during normal mobile station position determinations, in order to maintain and improve the antenna location data, and to correct for change or relocation of the base station antennas. It is possible to recover quickly from a loss of cell sector identity during relocation of a base station antenna, and to ensure accuracy of mobile station position determination based on ranging from the base stations, and rapid acquisition of position data from mobile stations having global satellite receivers.

12 Claims, 9 Drawing Sheets

USE OF MOBILE STATIONS FOR DETERMINATION OF BASE STATION LOCATION PARAMETERS IN A WIRELESS MOBILE COMMUNICATION SYSTEM

RELATED APPLICATIONS

The present application claims priority of U.S. provisional application Ser. No. 60/343,748 filed Dec. 27, 2001, incorporated herein by reference. The application also claims priority to U.S. application Ser. No. 10/093,751 filed on Mar. 7, 2002.

BACKGROUND OF THE INVENTION

1. Field of the Invention

This invention relates generally to mobile communication and more particularly to the determination of the positions of base stations in a mobile communication network.

2. Description of the Related Art

Mobile communication networks are in the process of offering increasingly sophisticated capabilities for locating the position of a mobile terminal of the network. The regulatory requirements of a jurisdiction may require a network operator to report the location of a mobile terminal when the mobile terminal places a call to an emergency service, such as a 911 call in the United States. In a Code Division Multiple Access (CDMA) digital cellular network, the position location capability can be provided by Advanced Forward Link Trilateration (AFLT), a technique that computes the location of the mobile station (MS) from the mobile station's measured time of arrival of radio signals from the base stations. A more advanced technique is hybrid position location, where the mobile station employs a Global Positioning System (GPS) receiver and the position is computed based on both AFLT and GPS measurements.

Message protocols and formats for CDMA position location employing AFLT, GPS, and hybrid receivers, applicable to both the MS-based and MS-assisted cases, have been published in TIA/EIA standard IS-801-1 2001, Position Determination Service Standard for Dual-Mode Spread Spectrum Systems—Addendum, incorporated herein by reference. Page 4-43 of this standard specifies that each base station shall transmit a GPS reference time correction of the base station antenna transmitting the CDMA pilot pseudorandom (PN) sequence.

Another position location technique is where the measurements are made by a network entity, rather than the mobile station. An example of these network-based methods is the RTD measurement carried out by the serving base stations. Measurements made by the mobile station may be combined with network-based measurements to enhance the availability and accuracy of the computed position.

Data concerning calibration or re-calibration of a base station time offset, base station antenna location and other parameters are stored in what is called a "base station almanac." The base station almanac data base provides information for determining an initial position estimate to seed GPS pseudorange searching. The base station almanac data base provides information for resolving ambiguity about which observed pseudorandom noise sequences (PNs) equate to which physical sectors of a GPS-capable IS-95 CDMA network. The base station almanac data base provides the cellular base station sector antenna position from which signals emerge. AFLT range measurements are made to these antenna positions.

SUMMARY OF THE INVENTION

In a wireless communication system, wireless base stations are typically used as references for the determination of mobile station position. In order to use a base station as a reference, the base station antenna position should be known with precision, as well as base station signal timing information. The base station antenna position and timing information is recorded in a base station almanac data base for use by a position determining entity. Acquiring this antenna location and timing information can be tedious and expensive.

Often a base station antenna is relocated, or a base station transceiver is repaired or replaced, causing a change in the base station antenna position or timing information. Often a base station can be logically moved, when, for example, two physical base stations swap their identification information. While neither base station physically moves, they appear (to a BS user) to have swapped locations.

In such situations, it is possible that the corresponding information in the data base will become erroneous unless the data base is updated before resuming service from the base station. Often the antenna location is determined by a survey or with reference to coordinates read from a map, and the antenna coordinates are entered manually into the data base, with the possibility of human error. The base station timing information is also subject to human error in cases where custom hardware is used to measure the timing information, and timing offsets are entered manually into the data base.

To address these problems, the present invention uses the mobile stations in communication with a base station for determining the location parameters of that base station. For example, the positions of the mobile stations are determined, and then the position of the base station is determined from the positions of the mobile stations and from signals transmitted between the base station and the mobile stations. Despite erroneous base station location parameters for at least one of the base stations, it is often possible to accurately determine the positions of the mobile stations from the base station location parameters of other base stations, or from global satellite signals received by the mobile stations if the mobile stations are equipped with global satellite receivers.

In addition, the base station location information in the data base can be checked during normal position location sessions whenever the position of a mobile station is determined independent of the location of a base station in communication with the base station. This is done by determining the distance between the base station and the mobile station from signals transmitted between the base station and the mobile station. When this distance is inconsistent with the base station location information in the data base, the data base may be modified to include corrected base station location information. In this fashion, it is possible to find erroneous base station information and discontinue its use for position location services before the correct location of the base station becomes known.

Erroneous base station location information can be corrected automatically once a sufficient number of independent distances are determined between the base station and mobile stations having known positions. With a sufficient number of independent distance measurements, it is possible to determine the base station location with a degree of certainty comparable to the position of a single mobile station. In this fashion, it is possible to automatically maintain and improve the base station location information in the data base. This can be done while providing regular position location services, without any change in the communication protocols between the base stations and the mobile stations.

In a preferred implementation, the position and timing offset of a mobile station is determined independently of the position and timing offset of a base station. If the position and timing offset of the mobile station is determined from global position satellites or from a number of quality signals from base stations having known positions and timing offsets, then it is possible for the position and timing offset of the mobile station to be quite precise, often to approximately meter and nanosecond level accuracy. This position and timing offset now known for the mobile station, together with a measurement of signal transmission between the mobile station and the base station, gives a constraint upon the possible location of the base station. After collection of multiple measurements upon the base station from one or more mobile stations from several different known locations, these measurements are used as input to a conventional position and time offset computation procedure, such as least squares, or a Kalman filter, as is commonly understood in the art of navigation (e.g., GPS and AFLT). This computation procedure is used to determine the position and time offset of a base station from known positions and known time offsets of multiple mobile stations, in contrast to the conventional use of the computation procedure for computing the position and time offset of a mobile station from the known positions and known time offsets of multiple base stations.

BRIEF DESCRIPTION OF THE DRAWINGS

Other objects and advantages of the invention will become apparent upon reading the following detailed description with reference to the accompanying drawings, in which.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DETAILED DESCRIPTION OF THE INVENTION

Figure 1:
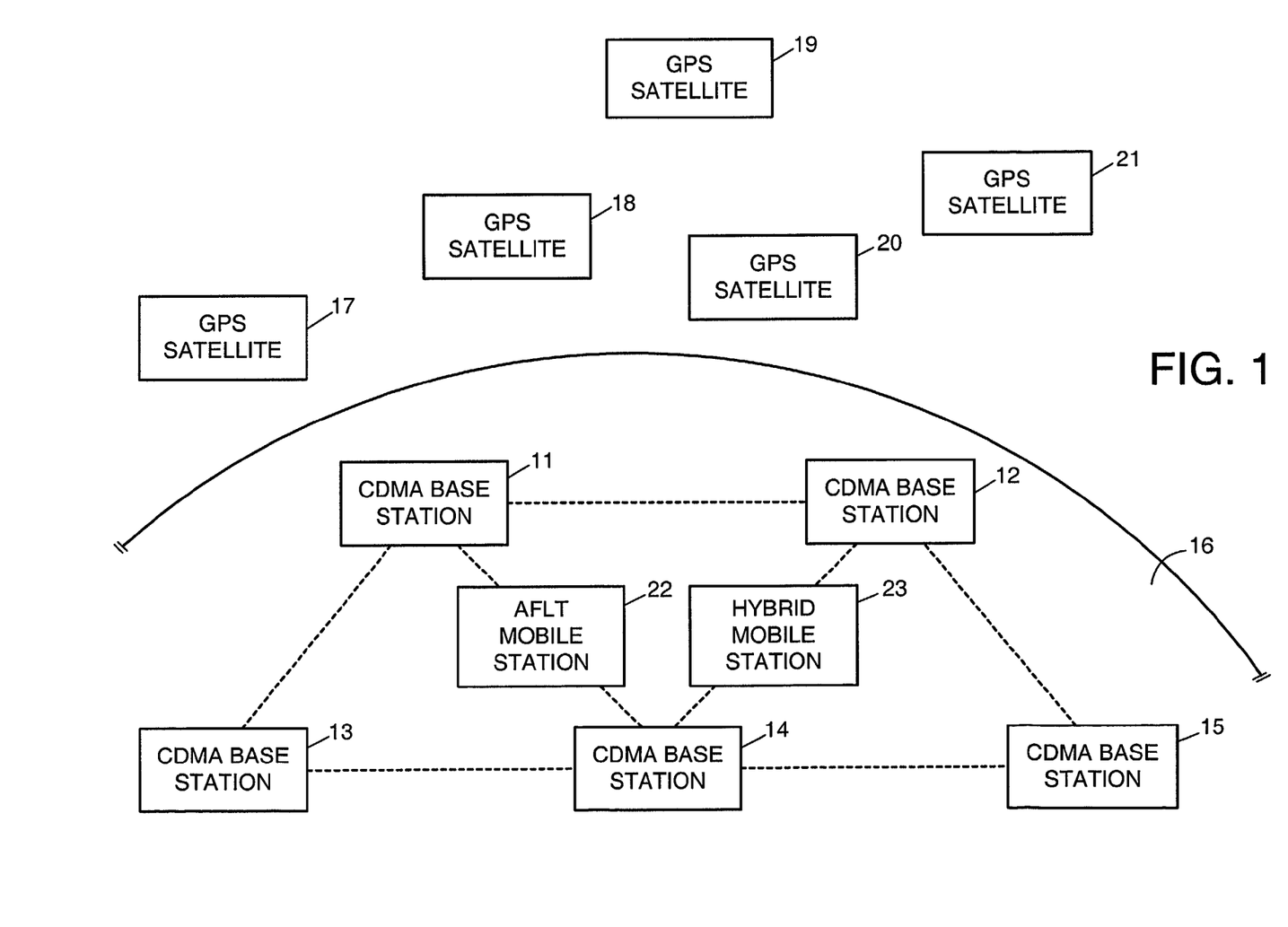
FIG. 1 shows a cellular telephone network using the GPS system for locating mobile telephone units and calibrating base stations.

FIG. 1 shows a CDMA cellular telephone network using a GPS system for locating mobile telephone units and calibrating base stations. The invention will be described with reference to this example, but it should be appreciated that the invention is not limited to the use of CDMA or GPS. For example, the invention could be practiced in a Time Division Multiple Access (TDMA) cellular telephone network, and the invention could be used without the use of any kind of global satellite system for assisting position location.

In general, to practice the present invention with any kind of wireless communication network, such as a TDMA cellular telephone network, it is advisable to consult the applicable industry standards for specifications regarding compatible location services. For example, the TIA/EIA standard IS-801-1 2001, Position Determination Service Standard for Dual-Mode Spread Spectrum Systems, is especially adapted for a CDMA network using AFLT and GPS. The TIA/EIA standard ANSI-136 (System Assisted Mobile Positioning through Satellites) is adapted to TDMA digital PCS systems in the United States. The $3^{rd}$ Generation Partnership Project standards 3GPP TS 04.31 and TS 25.331 Location Services (LCS) (UE position using OTDOA) are adapted to certain European GSM wireless telephone networks.

FIG. 1 shows five CDMA base stations 11, 12, 13, 14, 15 laid out in fixed positions in a hexagonal array on the surface of the earth 16. At about 11,000 nautical miles above the earth, there are at least five GPS satellites 17, 18, 19, 20, 21 in line-of-sight communication with the base stations 11 to 15. Within telecommunications range of the base stations, there are a number of mobile CDMA telephone units 22, 23, which are referred to as mobile stations (MS) in the TIA standards documents cited above. These mobile stations (MS) include AFLT only mobile stations, such as the AFLT mobile station 22, and hybrid mobile stations, such as the hybrid mobile station 23.

The CDMA network is capable of locating the position of the AFLT mobile station 22 and the hybrid mobile station 23 using the well-known AFLT technique of the mobile station measuring the time of arrival of so-called pilot radio signals from the base stations. The time of arrival is indicated by a pilot phase measurement that is relative to the mobile station's time base. Differences of the pilot phase measurements from respective pairs of neighboring base stations are computed in order to eliminate the effect of any time offset in the mobile station's time base. In most cases, each difference locates the mobile station on a particular hyperbola. The intersection of the hyperbolas provides the location of the mobile station.

The CDMA network is also capable of locating the position of the hybrid mobile station 23 using the well-known GPS technique. Each CDMA base station 11 to 15 has a GPS receiver receiving the carrier and pseudorandom code sequence of at least one of the GPS satellites 17 to 21 to provide a CDMA system time base referenced to the GPS system time base. When a hybrid mobile station participates in a position location session with the CDMA network, the serving base station may send GPS acquisition data to the hybrid mobile station. The hybrid mobile station 23 may use the GPS acquisition data to obtain, in about ten seconds or less, a measurement of the pseudorange between each GPS satellite 17 to 21 and the mobile station. In the case of an MS-assisted solution, the hybrid mobile station 23 transmits the pseudorange measurements to the serving base station.

As further described below with reference to FIG. 3, a position determining entity (PDE) may compute the geographic location of the hybrid mobile station 23 from four or more of the pseudorange measurements. Alternatively, in the case of an MS-based solution, the geographic location of the mobile station may be calculated by the mobile station itself.

Figure 2:
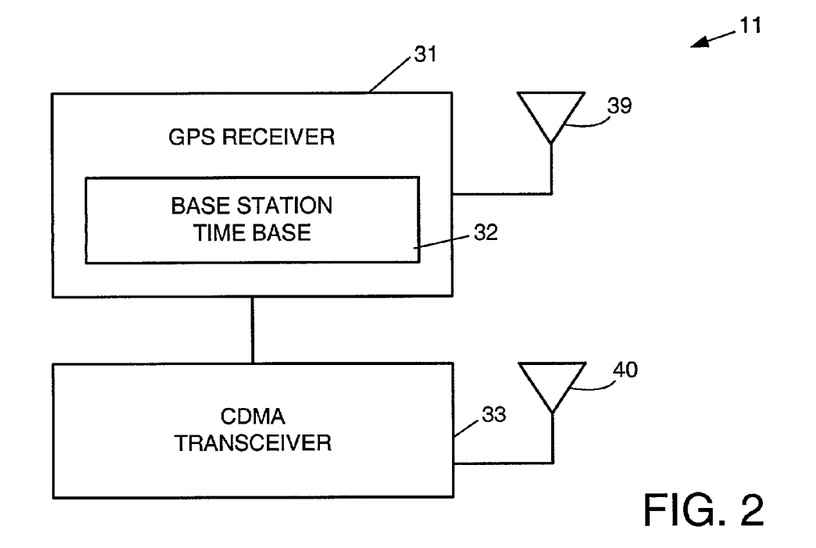
FIG. 2 is a block diagram of a base station in the cellular telephone network of FIG. 1.

FIG. 2 shows the functional blocks in each base station in the cellular telephone network of FIG. 1. Base station 11 includes a GPS receiver 31 providing a base station time base 32 referenced to GPS system time. The GPS receiver 31 obtains signals from a GPS antenna 39. The base station also includes a CDMA transceiver 33 for communicating with mobile stations in the CDMA network. The CDMA transceiver 33 obtains CDMA system time from the base station time base 32. The CDMA transceiver 33 sends and receives wireless signals through a CDMA antenna 40.

Figure 3:
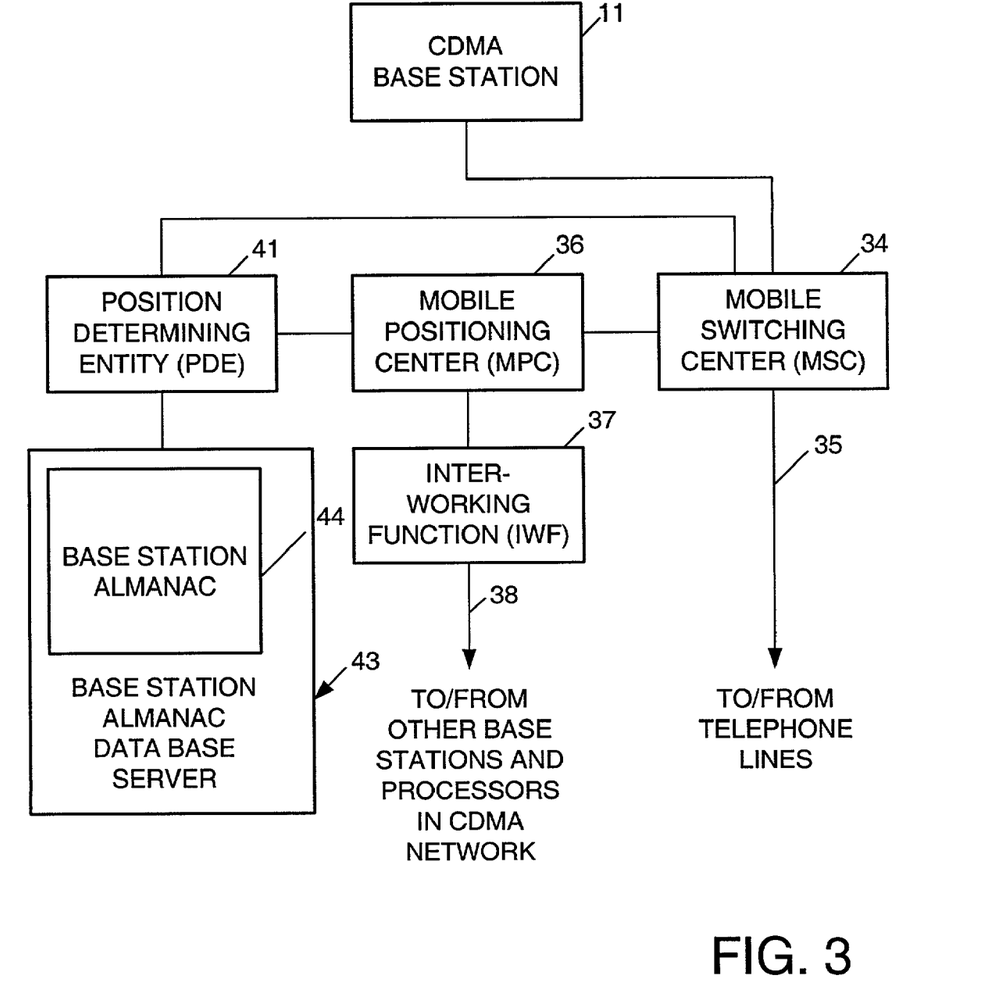
FIG. 3 is a block diagram of stationary components of the cellular telephone network of FIG. 1, including a position determining entity accessing a base station almanac data base.

FIG. 3 is a block diagram of stationary components of the cellular telephone network of FIG. 1. A mobile switching center (MSC) 34 interfaces voice signals and telecommunication data between base station 11 and a number of telephone lines 35, such as copper wires or optical fibers. A mobile positioning center (MPC) 36 is connected to mobile switching center (MSC) 34. The MPC 36 manages position location applications and interfaces location data to external data networks through an interworking function (IWF) 37 and a data network link 38. A position determining entity (PDE) 41 collects and formats position location data. The PDE 41 provides wireless assistance to mobile stations and it may perform position computations. The PDE 41 is connected to the MPC 36 and the MSC 34. The PDE 41 accesses a base station almanac data base 44 that is managed by a base station almanac data base server 43. The PDE 41 and the base station almanac data base server 43 are implemented, for example, using conventional digital computers or work stations. The base station almanac 44 is stored in the hard disk of the computer for the base station almanac data base server 43, as further described below.

The base station time base (32 in FIG. 2) should be calibrated when the base station is installed or modified. Each base station can have a respective time offset between the GPS system time and the transmission of CDMA signals due to variations in propagation delay or phase shift from the GPS antenna (39 in FIG. 2) to the GPS receiver (31 in FIG. 2), from the GPS receiver to the CDMA transceiver (33 in FIG. 2), and from the CDMA transceiver to the CDMA antenna (40 in FIG. 2). Therefore, to reduce ranging errors in AFLT position determinations and ranging and timing errors in hybrid position determinations, every base station should be calibrated after the base station installation is complete, for example, by storing a time offset for the base station in the base station almanac data base (44 in FIG. 3) for use by the PDE (41 in FIG. 3).

Moreover, it is desirable to re-calibrate the base station and update the data base for any subsequent hardware change.

In order to calibrate or re-calibrate the base station, GPS and AFLT position measurement data is obtained from hybrid mobile stations during regular position location sessions when hybrid station users normally engage in telephone calls, or when field service personnel drive around to selected locations and place calls for the purpose of obtaining position measurement data not otherwise obtained from the regular position location sessions. In this fashion, the PDE (41 in FIG. 3) may compute the calibration data internally and store the calibration data in the base station almanac data base (44 in FIG. 3) on a continuous basis. In addition, to alleviate any privacy concerns, the regular position location sessions may occur only when the operator of the hybrid mobile station places or answers a wireless telephone call. In this case, the CDMA system does not determine the operator's position without the operator's knowledge and consent.

Base station antenna position information is important for performance results relating to the use of AFLT measurements for both initial approximate location determination and final location determination in either purely AFLT or hybrid modes. For example, the MS provides pilot phase measurement data to the PDE. The PDE uses the values provided for or derived from antenna position information to establish the initial approximate location. The presence of large errors in this data could contribute to sub-optimal performance. During final position computations, the PDE will use Pilot Phase Measurement data either alone (AFLT mode), or in combination with GPS (hybrid mode) data. In either case, the antenna location and elevation (height) should be provided to ensure best accuracy. It is desired for the base station antenna position information (latitude, longitude, and altitude) to be of "survey grade" in WGS-84 with an error of less than one meter, although with appropriate, known, uncertainties, poorer quality antenna positions can be used.

Figure 4:
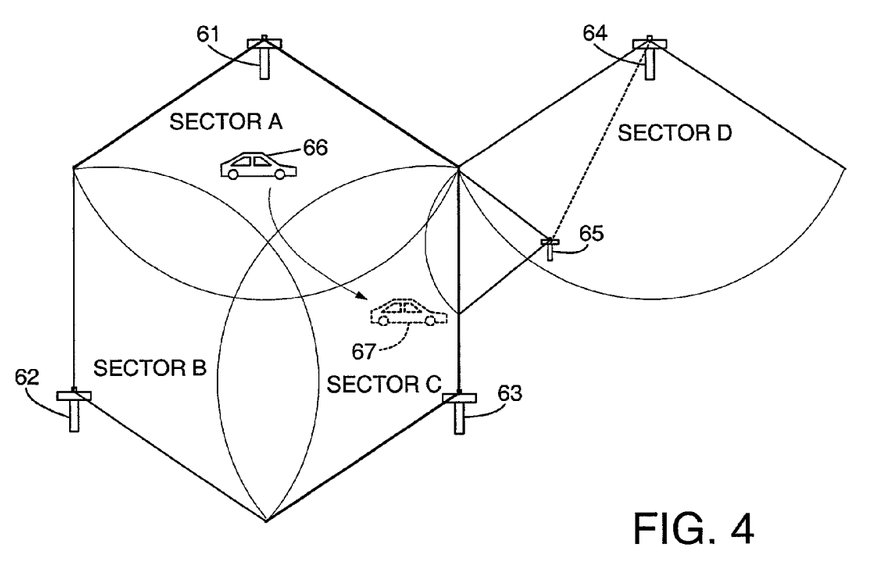
FIG. 4 is a cell coverage map including a number of cell sectors.

FIG. 4 shows respective cell sector coverage areas (Sector A, Sector B, Sector C, and Sector D) for base station antennas 61, 62, 63, and 64. A repeater 65 extends the coverage area of the base station antenna 64. Perhaps even before the beginning of a fix process, just before the mobile 66 enters the traffic channel, the sector identity information is recorded. Some time thereafter, with the mobile 66 in the communications state, the mobile begins to make a location fix. The mobile 66 notes the current PN number and sends it along with the recorded sector identity information to the PDE in an IS-801.1 message. Note that the mobile 66 may have handed off to sector different from the sector at which the sector identity information was recorded; for example, the mobile has handed off from Sector A to Sector B when the mobile reaches the position 67 shown in dashed line representation. In this case, the current PN number and the sector identity information may belong to different cells. The sector identity information belongs to the serving sector, while the PN number belongs to the reference sector. Note also that PNs are not unique and typically repeat many times within any cellular network.

Also sent in this initial IS-801.1 message are sector range measurements seen by the mobile at that time, including the reference sector and possibly other sectors. These are identifiable only by PN number, and are known as measurement sectors. Note that the reference sector, and the serving sector if still seen, are also measurement sectors. These range measurements are used to generate a coarse position, known as a prefix, which uses AFLT measurements only and is typically less accurate than the final fix performed later.

The purpose of the prefix is to generate a more precise initial position estimate, which enables more accurate GPS assistance information than would be possible using only knowledge of the reference sector. More accurate GPS assistance information improves GPS accuracy and yield, and reduces processing time. The prefix is optional, and if for whatever reason it is not available, an initial position estimate based on the reference sector is used.

After GPS assist information is sent to the mobile, the mobile collects a second set of AFLT measurements and a set of GPS measurements, known as the final fix. Since PN numbers are not unique, the PDE must resolve which PN number seen belongs to which physical sector. This can be a complex process, since sectors with the same PN number are often spaced as close as 8 km from each other or even closer, often creating PN ambiguities. This spacing is used to determine the reference sector from the serving sector, and the measurement sectors from the reference sector. Only cells within a distance threshold are considered. The distance threshold is determined by scaling the Max Antenna Range parameter of the BSA.

If no sectors with the target PN and frequency are found, the lookup fails. Likewise, if more than one sector with the target PN and frequency are found and the PDE is unable to determine which one is the real one, the lookup fails. If one sector with the target PN is found, then the lookup is successful, and that sector is presumed to belong to the PN observed. If a lookup fails when trying to determine the reference sector from the serving sector, then the serving sector is presumed to be the reference sector. If a lookup fails when trying to determine a measurement sector from the reference sector, then that measurement PN is not usable and is ignored. If the sector identity information is not found in the BSA at all, then a GPS fix is attempted using default initial position estimate information stored in the PDE's configuration file or registry.

It is also possible to make an initial position estimate based on Network ID/System ID and coverage area centroids. The coverage area centroid, for example, is an average of mobile station positions having been determined to be within the coverage area of a base station sector antenna. In this method the PDE automatically determines a position and uncertainty for the coverage area of all the cells with each unique Network ID and System ID by examining all the sectors in the BSA. This information serves several purposes. If no better initial position estimate is available, the Network ID/System ID position and uncertainty can be used. This would happen, for example, when the sector identity information seen by the MS is not found in the BSA. Note that the initial position estimate will have much higher uncertainty in this case, which can reduce GPS accuracy and yield, and will result in longer MS processing times. If all better methods for determining final fix position are not available, the Network ID/System ID centroid position and uncertainty will be reported.

In short, GPS and AFLT position measurement information from hybrid mobile stations can be combined to generate pseudorange offsets and base station time base offsets. In addition to providing base station time base offsets for base station calibration, the pseudorange offsets at various physical locations in the wireless coverage area, such as for various cell sectors, can be compiled and used for correction of position fixes of mobile stations determined to be in the vicinity of the cell sectors. For example, the distance correction is quantified as a forward link calibration value (FLC). In particular, the FLC is defined as the time difference between the time stamp on the data being transmitted by the mobile station and the actual transmission time.

The components that contribute to the FLC are cable delays of the base station GPS receive antenna, the GPS receiver timing strobe output to base station transmit hardware timing strobe input, and the base station transmit antenna. The base station almanac data base server automatically adjusts the FLC fields in the base station almanac data base based on the GPS and AFLT position measurement data from the hybrid mobile stations. By using the more accurate FLC values for sectors, the range measurements can be improved from about 0 to 30 percent.

Since GPS pseudoranges are so much more accurate, if a sufficient number of GPS satellites are seen, the final reported fix would be based almost exclusively on GPS. Fortunately, in these cases, the distance estimates to the sector antennas are still measured and saved in PDE log files. Thus all the information needed to determine the new calibrated FLC value is available. This information includes: the old "default" or "average" FLC value; the fix position, determined using GPS measurements, the sector antenna position from the base station almanac data base, and the measured distance estimate to each cell sector antenna, determined using pilot phase measurements with the AFLT technique. The following equation relates these inputs to the new FLC value:

New_FLC=Old_FLC−(distance_from_fix_position_to_antenna−measured_distance_estimate)

The above equation omits units conversion constants. For example, if FLC is measured in so-called pseudorandom number Chip_x_8 units, the formula for the new FLC value is:

$$FLC_{NEW} = FLC_{OLD} + \frac{Residual}{30.52}$$

where:
 $FLC_{NEW}$=the new Forward Link Calibration value, in Chip_x_8 units
 $FLC_{OLD}$=the Forward Link Calibration value used during the PDE collect, in Chip_x_8 units
 Residual=the residual for a specific sector pseudorange measurement, in meters, which is what emerges from the PDE if ground truth is not known
 30.52=the number of meters per Chip_x_8 unit.

A key to adjustment of the FLC is that the position fix should be of high accuracy, since any fix position error would translate into error in the new FLC value. Fix position can be assessed with high confidence using a "Horizontal Estimated Position Error" (HEPE) quality measure, which is the PDE's own estimate of the error of each location fix. Thus, only fixes that meet some quality threshold—such as having a HEPE value of less then 50 meters—should be used for these calculations.

Pilot measurements are calculated to all sectors heard by the handset with each fix. Depending on the environment, this is usually at least a modest handful of sectors, and often as many as 20 or more in dense urban environments. Thus each fix results in many distance estimates, all of which are useable in this process.

An initial base station almanac data base should exist in this process so that the PDE can resolve the sector identity of each sector seen. However the quality of the FLC values for these sectors is not important. "Default" or "average" values of FLC can be used. The key is that the sector identities seen by the handset exist in the base station almanac data base. It is desired for the antenna positions to be reasonably accurate, but the antenna positions do not need to be known precisely at any time. If understanding of an antenna position improves over time, this can be factored in to obtain an antenna position of greater certainty, and used to improve the forward link calibration accuracy. In addition, the base station almanac data base server can determine if an antenna has been moved, and in this instance, a precise but outdated antenna location can be removed from the base station almanac data base and replaced with an updated location.

Figure 5:
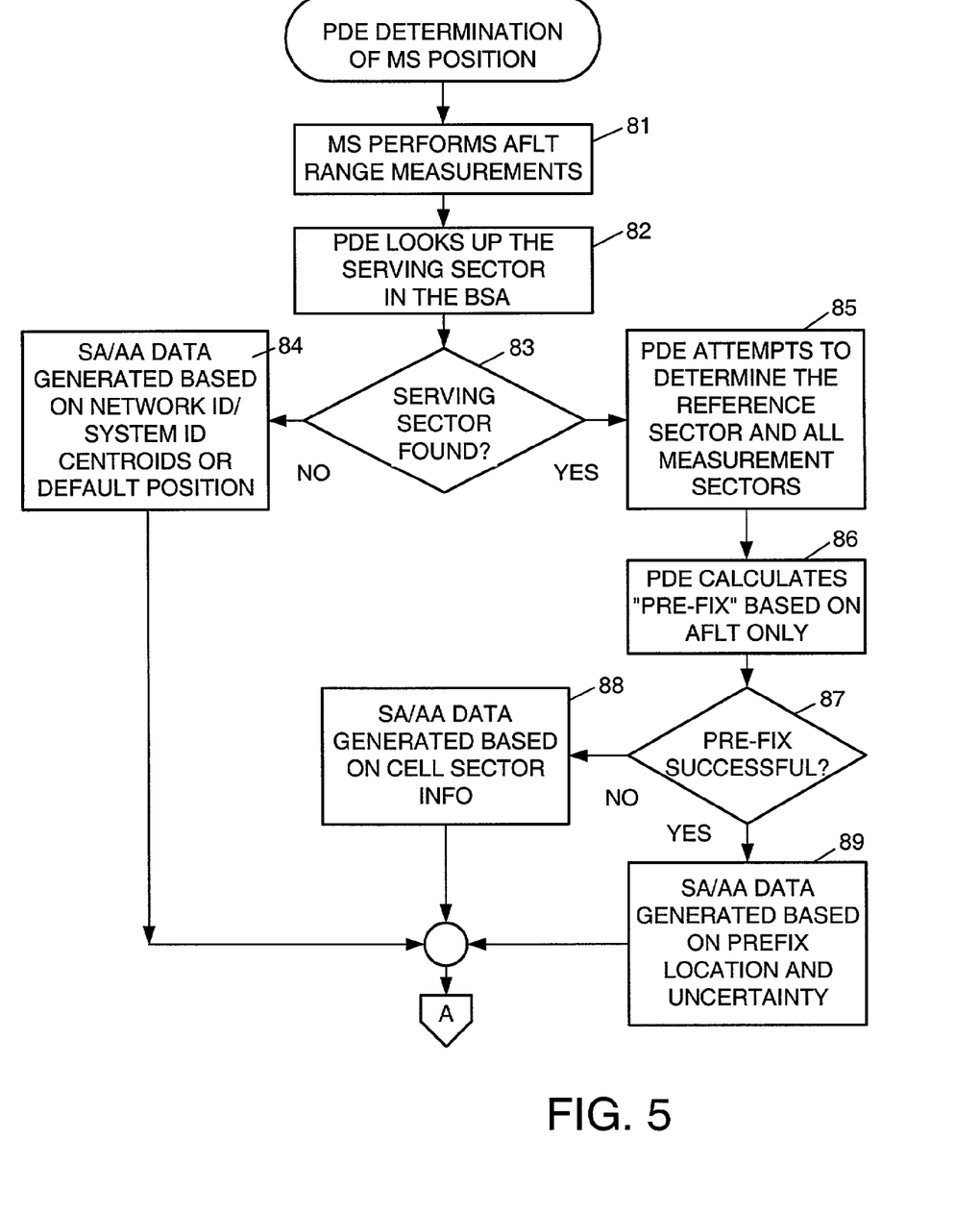
FIGS. 5 and 6 comprise a flow chart showing how a position determining entity determines the position of a mobile station.
Figure 6:
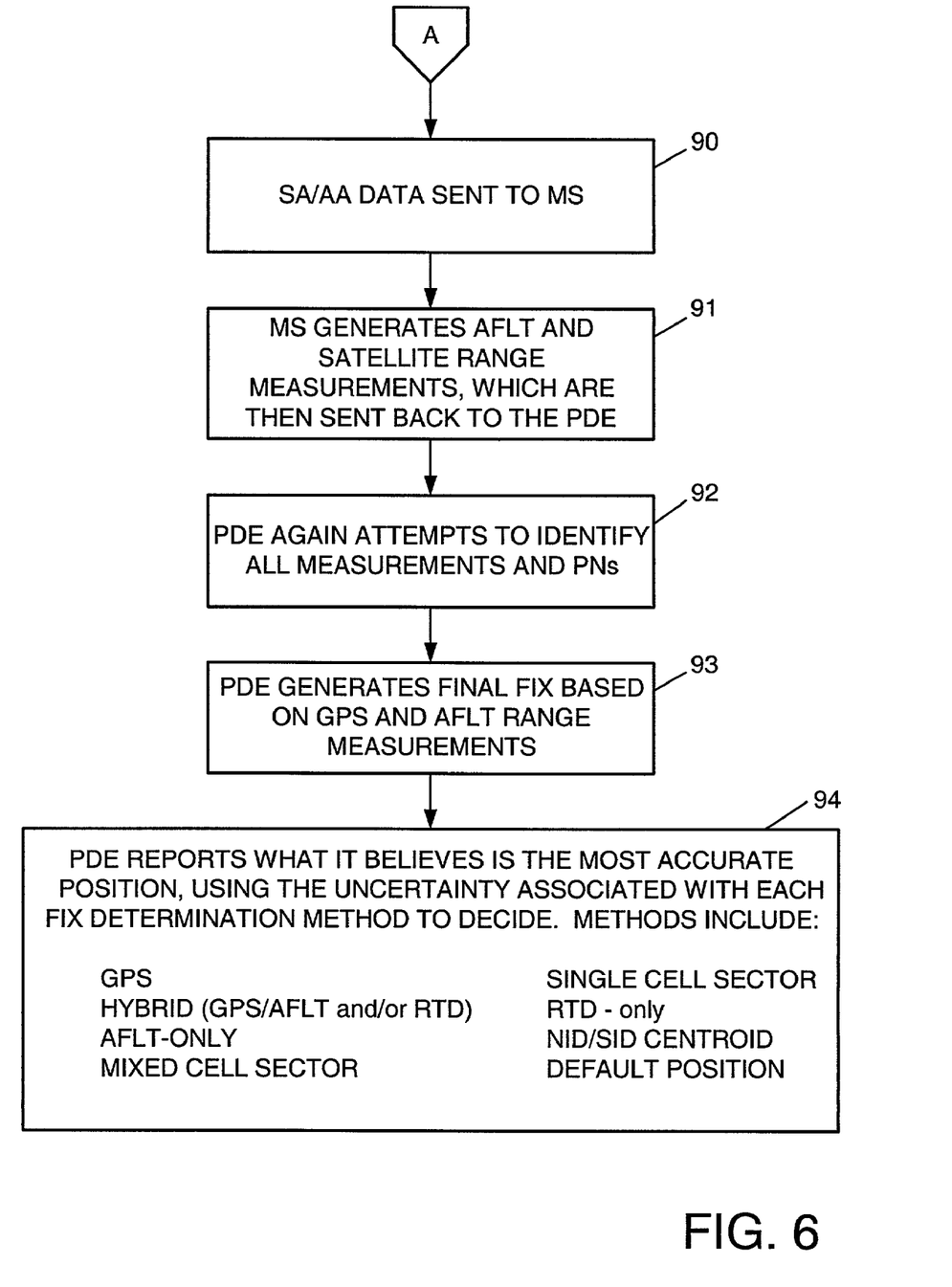

FIGS. 5 and 6 shows an example of how the PDE can be programmed to determine the position location of a mobile station. In the first step 81 of FIG. 5, the PDE makes an initial position estimate based on AFLT measurements sent initially from the MS to the PDE. In step 82, the PDE attempts to associate the PNs seen by the mobile stations with specific cell sectors recorded in the base station almanac data base. If the sector that is serving the MS can not be uniquely identified, then AFLT is not possible since the PDE is not able to determine from which base station antenna towers the AFLT range measurements originate. Therefore, execution branches from step 83 to 84 if the sector that is serving the MS cannot be uniquely identified. Otherwise, execution continues from step 83 to step 85.

In step 84, Sensitivity Assist (SA) and Acquisition Assist (AA) data is generated based on network ID or system ID centroids or default position. The SA/AA data will be sent to the MS (in step 90 of FIG. 6) in order to aid the MS in GPS acquisition and GPS pseudorange measurement. Because the serving cell has not been found, AFLT is not possible, and GPS accuracy and yield may be seriously impaired. Execution continues from step 84 to step 90 in FIG. 6.

In step 85 of FIG. 5, the PDE attempts to determine the reference sector and all measurement sectors. If a measurement PN cannot be uniquely associated with a single sector, that range measurement is not used. If the reference cell cannot be uniquely determined, the serving cell is used in its place. Next, in step 86, the PDE calculates a "pre-fix" based on AFLT only. Then in step 87, execution branches to step 89 if the "pre-fix" calculation of step 86 was not successful. Otherwise, execution continues from step 87 to step 88.

In step 88, SA/AA data is generated based on cell sector information. Execution continues from step 88 to step 90 of FIG. 6.

In step 89 of FIG. 5, SA/AA data is generated based on the pre-fix location and uncertainty. The smaller the initial position uncertainty, the more precise the AA data, the faster the processing in the MS will be, and the better final fix accuracy and yield. Execution continues from step 89 to step 90 of FIG. 6.

In step 90 of FIG. 6, the SA/AA data is sent to the MS. The MS uses the SA/AA data for GPS acquisition and GPS pseudorange measurement. The MS searches for the GPS satellites indicated in the assist data, and perform a second round of searching for AFLT pseudoranges. In step 91, the PDE receives from the MS the GPS and AFLT pseudoranges. In step 92, the PDE again attempts to identify all measurement PNs. If a PN cannot be uniquely identified with a single sector, then that range measurement is not used. In step 93, the PDE generates a final fix based on the GPS and AFLT range measurements.

In step 94, the PDE may use several methods in parallel to calculate the final position, and the approach most likely to achieve the least position error is used. A GPS fix is attempted first, because accuracy is far superior to any other method. If the GPS fix fails, the PDE select from among several other approaches, and the result with the smallest associated error estimate is used. These other approaches include: AFLT-only; a position determined by knowing the sector orientation and the approximate range using an RTD measurement (where available); a "mixed cell sector" fix determined using knowledge of the sectors seen by the mobile, and each sectors' position and orientation; a current serving sector coverage area centroid position determination (or if it was not possible to determine the current serving sector, the original serving sector); the centroid position of the current Network ID/System ID coverage region; and finally a default position stored in the PDE's configuration file.

The use of an FLC for each sector to correct the position of an MS in the vicinity of the sector can be improved by the accumulation and statistical analysis of multiple distance estimates to various mobile stations in each sector, preferably from diverse locations within the sector coverage area. By gathering a sample set, statistical processing on the set can be applied to determine the most optimal new FLC value to use. Averaging this data, and using data collected from a diverse set of locations within each sector's coverage area, has been found to yield more accurate FLC values.

A sample set can be gathered from regular position location sessions during normal telephone calls to or from hybrid mobile stations, and/or from drive-around field collection. For additional quality of the collected data, the drive-around field collection can be performed by technical field personnel in vehicles each equipped with a hybrid mobile handset linked to an external PCS antenna and an external active GPS antenna. In areas where multiple CDMA frequencies are in use, data should be collected on each frequency, since each sector-CDMA-frequency permutation is calibrated separately. For example, when using a drive-around approach, multiple handsets should be used to ensure sufficient frequency diversity.

The present invention more particularly relates to the use of mobile stations for determining base station antenna location information. This can be done not only to provide more accurate position fixes of the mobile stations but also to ensure proper cellular coverage from base stations that have been either physically relocated or have become impaired due to erroneous antenna location information in the base station almanac. In the worst case, a change in antenna location may result in a cell sector identification problem in which the signals observed by a handset (i.e., a wireless mobile station) cannot be properly related to information in the base station almanac data base.

The base station almanac data base server discovers instances where an identity observed by a handset is not found in the base station almanac data base, and tracks such occurrences over time. The base station almanac data base server identifies new sectors that are added to the network, and advises the system operator of such changes. The base station almanac data base server generates a base station almanac data base entry including determination of the antenna location, the observed identity, calibration and uncertainty parameters calculated automatically, and default values. The base station almanac data base server also identifies sectors whose identity observed by the handset or reported by the cellular infrastructure has changed due to a network change or reconfiguration and no longer matches the base station almanac data base. The base station almanac data base server automatically alters the base station almanac data base to reflect the new identity.

For terrestrial range measurements, the antenna position helps the PDE to resolve the reference sector and measurement sector identities, and is the location from where the range measurements originate. Antenna position errors translate to terrestrial range errors. Antenna position is also essential in generating an "initial position estimate", which is used to generate GPS assist information.

The base station almanac data base server identifies base station almanac data base sector antenna positions that are not consistent with the measured position. This can result from mobile cells (COWs and COLTs) or from typos in the base station almanac data base. The base station almanac data base server advises the system operator of such problems, and if so configured, the base station almanac data base server will automatically fix the problems.

In order to rapidly identify any apparent changes in sector antenna positions, it is desired to measure the sector antenna positions on an ongoing basis during routine use of the wireless communications system. This can be done using a method of inverse sector antenna positioning. Inverse sector antenna positioning is a way of determining the location of a sector antenna from data from a mobile station.

In some cases, a cell sector is known to exist based on handset measurements of that sector's signal, but the sector antenna location is not known. If the handset position can be determined based on other measurements, that handset position and the measured range to the sector antenna can serve as a valuable input for determining the location of the sector antenna.

In many cases, a handset position can be determined without knowing the source of the unknown sector—for example based on a good GPS fix, or an AFLT or hybrid fix that does not use a measurement from the unknown sector. If this happens multiple times, from different positions, each of these location-fixes serves as both an origin point (the handset position) and a range to this unknown sector's antenna position.

These positions and ranges can serve as inputs to a navigation processor, which can calculate the sector antenna position in the same way that, for example, GPS satellite positions and ranges are used to calculate the position of a GPS receiver. Many methods are available for doing this navigation processing, such as least-mean-squares iteration, and Kalman filtering, and are well understood by one of ordinary skill in the art.

As one of ordinary skill in the art can also appreciate, it is important that the reference points are sufficiently far apart, compared to the ranges to the sector antenna, so that the geometry is adequate to accurately calculate the sector antenna position. Additionally, each input range from the handset positions should have an error estimate associated with it that combines both the uncertainty in the reference handset position, and the estimated uncertainty in the range based on, for example, possible excess path length signal delays. These measurement error estimates can be combined in the navigation-processing algorithm to estimate the error in the determination of sector antenna position.

Also, the range measurements to the sector antenna may contain a fairly constant bias due to sector transmitter time bias. This forward-link calibration can be solved for at the same time as the sector antenna position. Thus three-dimensional sector antenna position, as well as time-bias can be calculated in the same operation—in a manner similar to GPS receiver positioning.

It is recognized that solving for the vertical height of the sector antenna may sometimes be difficult, due to limited observable geometry in the vertical direction. The sector antenna height can be estimated based on an average antenna height (say 10 meters) above the average height of the handset reference positions and/or the terrain height based on a lookup into a terrain elevation database. While the errors in the vertical height of the sector antenna are somewhat hard to observe with this method, it is fortunate that those same errors contribute very little to location fix error when that sector is eventually added to the base station almanac data base and used as a reference location for handset positioning.

Once the sector antenna position has been reasonably determined by this method, a new sector can be added to the base station almanac data base and subsequently used for handset positioning, or an unidentified signal seen by the handset can be joined to an entry in the base station almanac data base with incorrect identity information and this identity information can be corrected.

With reference to FIGS. 7 to 10, there is shown a flow chart of an example of an implementation of inverse sector antenna positioning in the wireless communication network of FIG. 1. For example, the flow chart represents programming in the base station almanac data base server 43 FIG. 3 for maintenance and improvement of the base station location parameters in the base station almanac 44, and programming in the position determining entity 41 in FIG. 3 for determination of mobile station position and calculation of base station position.

Figure 7:
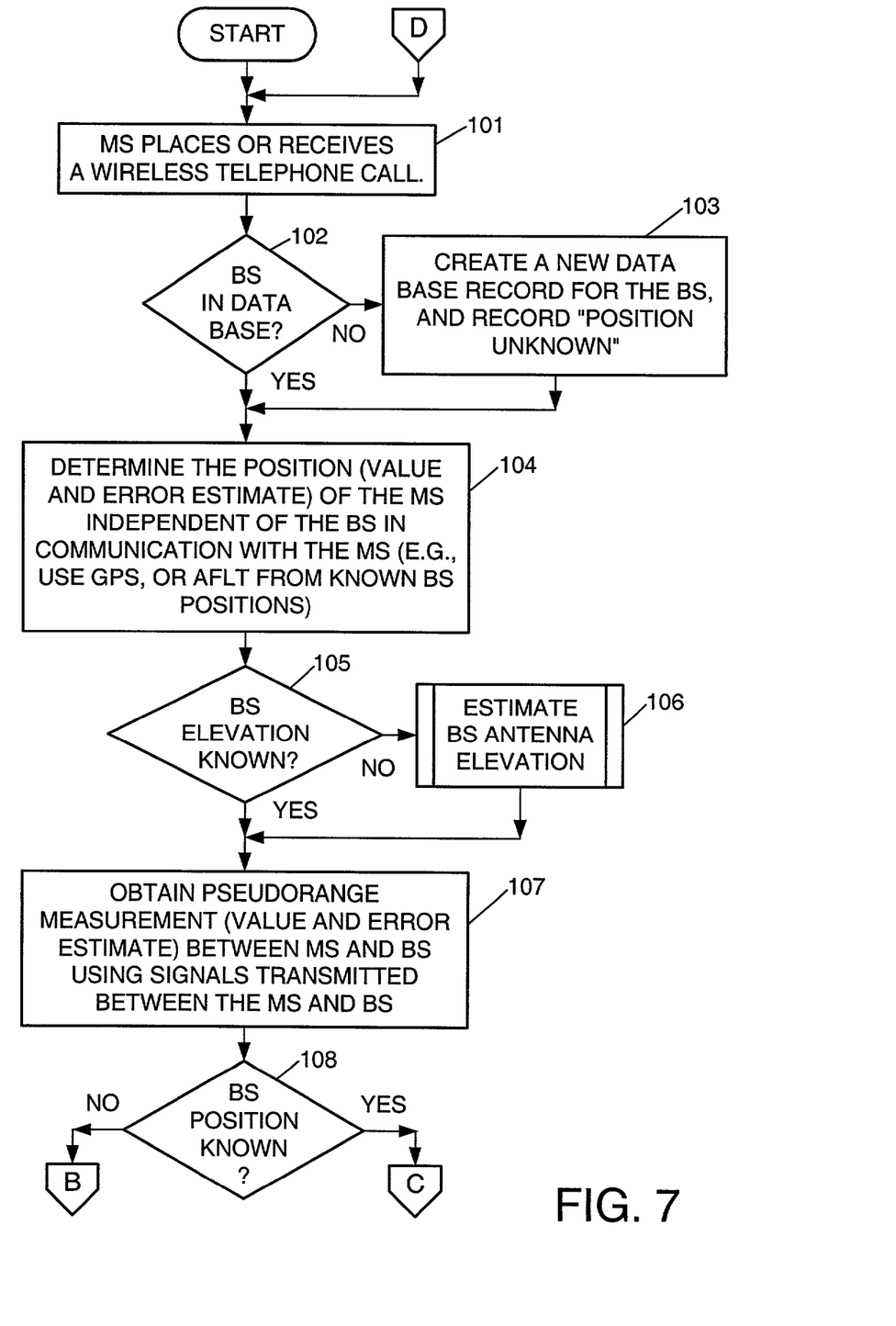
FIGS. 7, 8, and 9 comprise a flow chart showing how the position and time offset of a base station is determined from a number of mobile station positions, mobile station time offsets, and pseudoranges between the base station and the mobile station positions.

In a first step 101 of FIG. 7, a mobile station places or receives a wireless telephone call. During the process of establishing communication between the network and the mobile station, as described above with reference to FIG. 4, the network attempts to determine the cell sectors in communication with the mobile station from indications of base stations having received signals from the mobile stations. In step 102 of FIG. 7, if an indicated base station cannot be found in the base station almanac, then execution branches to step 103 to create a new data base record for the base station, and to record "position unknown" for the base station. After step 103, execution continues to step 104. Execution also continues to step 104 from step 102 if the base station is found in the base station almanac.

In step 104, the network determines the position (value and error estimate) of the mobile station independent of the position of the base station in communication with mobile station. For example, if the mobile station has a global satellite receiver for receiving global positioning signals, the position of the mobile station can be determined independent of the position of the base station, for example, using the GPS system. If the mobile station is in communication range of other base stations having know positions, then the position of the mobile station can be determined from signals transmitted between the mobile station and these other base stations, for example, using AFLT.

In step 105, if the base station antenna elevation is not know, then execution branches to step 106, to estimate the base station antenna elevation, as further described below with reference to FIG. 10. After step 106, execution continues to step 107. Execution also continues from step 105 to step 107 if the base station antenna elevation is known.

In step 107, the network obtains a pseudorange measurement (value and error estimate) between the mobile station and the base station using signals transmitted between the mobile station and base station, for example in the fashion described above with respect to forward link calibration. In step 108, if the base station position is not known, then execution continues to step 111 of FIG. 8. Otherwise, execution branches to step 121 of FIG. 9.

Figure 8:
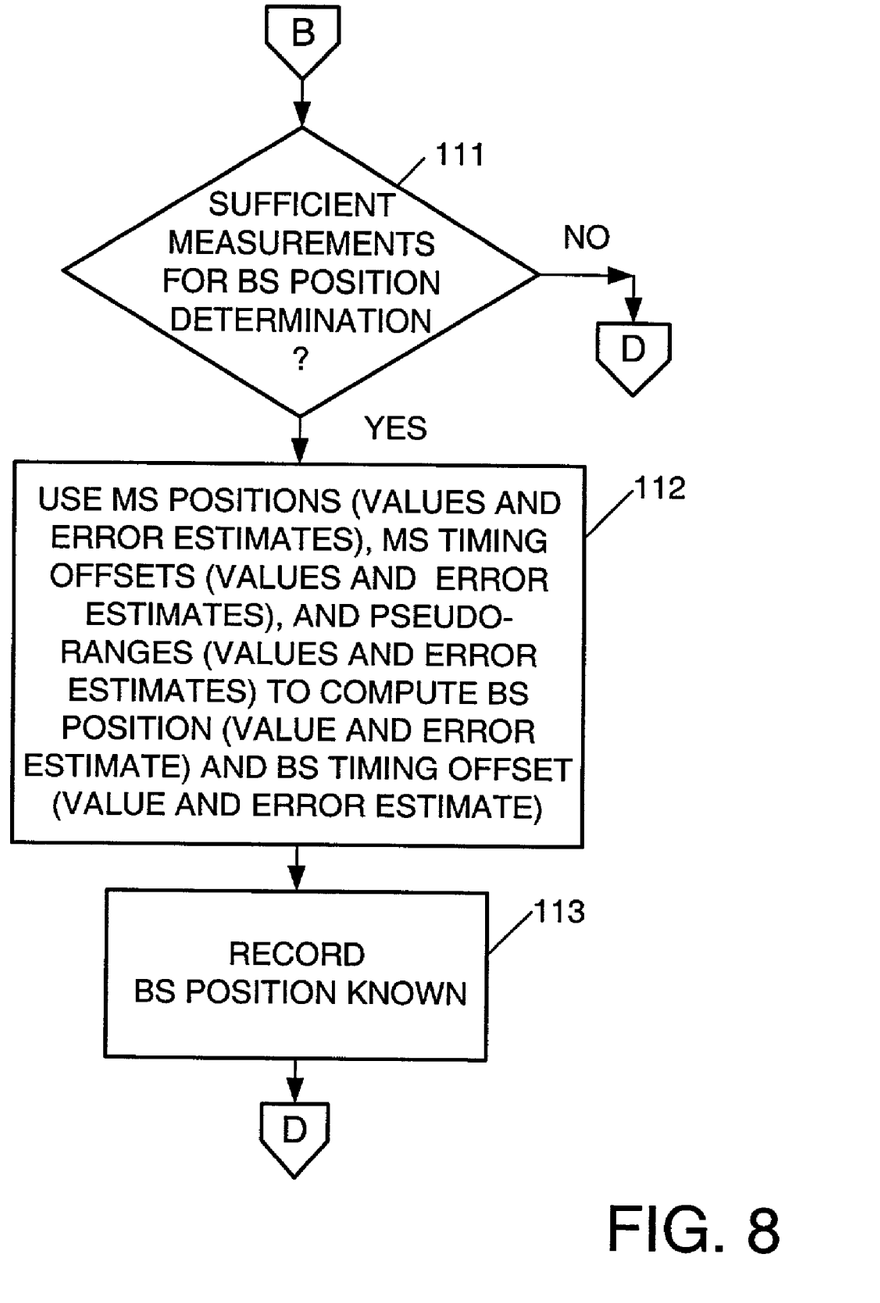

In step 111 of FIG. 8, if there are not sufficient measurements for determination of the base station position, then execution loops back to step 101. For example, to determine the latitude and longitude of a base station for the case of a known base station antenna elevation, there must be at least two pseudorange measurements from spaced mobile station positions for triangulation. Additional measurements are needed if the base station antenna elevation is unknown or if the pseudorange measurements are dependent upon base station timing offset. Once a sufficient number of measurements are obtained, execution continues from step 111 to step 112.

In step 112, the network uses the mobile station positions (values and error estimates), mobile station timing offsets (values and error estimates), and pseudoranges (values and error estimates) to compute base station position (value and error estimate) and base station timing offset (value and error estimate). For example, the uncertainty of a range measurement may be dependent on pilot signal strength, the resolution of PN sequences, satellite elevation in the case of a GPS range measurement, and the possibility of multi-path propagation in the case of terrestrial range measurements. The uncertainty of a range measurement is also dependent upon the uncertainty of the underlying location service parameters, such as the uncertainty in forward link calibration timing offset in the case of an AFLT range determination, the uncertainty in reverse link calibration in the case of an RTD range measurement, and the uncertainty of base station antenna position and terrain elevation in the case of AFLT or RTD range measurements. The uncertainty, for example, is quantified in terms of a standard deviation, based on statistics when there is sample population, or based on known resolution and estimated measurement error assuming a Gaussian distribution.

The computation procedure may use a conventional least squares program, or a Kalman filter, as is commonly understood in the art of navigation (e.g., GPS). This computation procedure is used to determine the position and time offset of a base station from known positions and known time offsets of multiple mobile stations, in contrast to the conventional use of the computation procedure for computing the position and time offset of a mobile station from the known positions and known time offsets of multiple base stations. In step 113, the base station almanac is updated to indicate that the position of the base station is known, and execution loops back to step 101 of FIG. 7.

Figure 9:
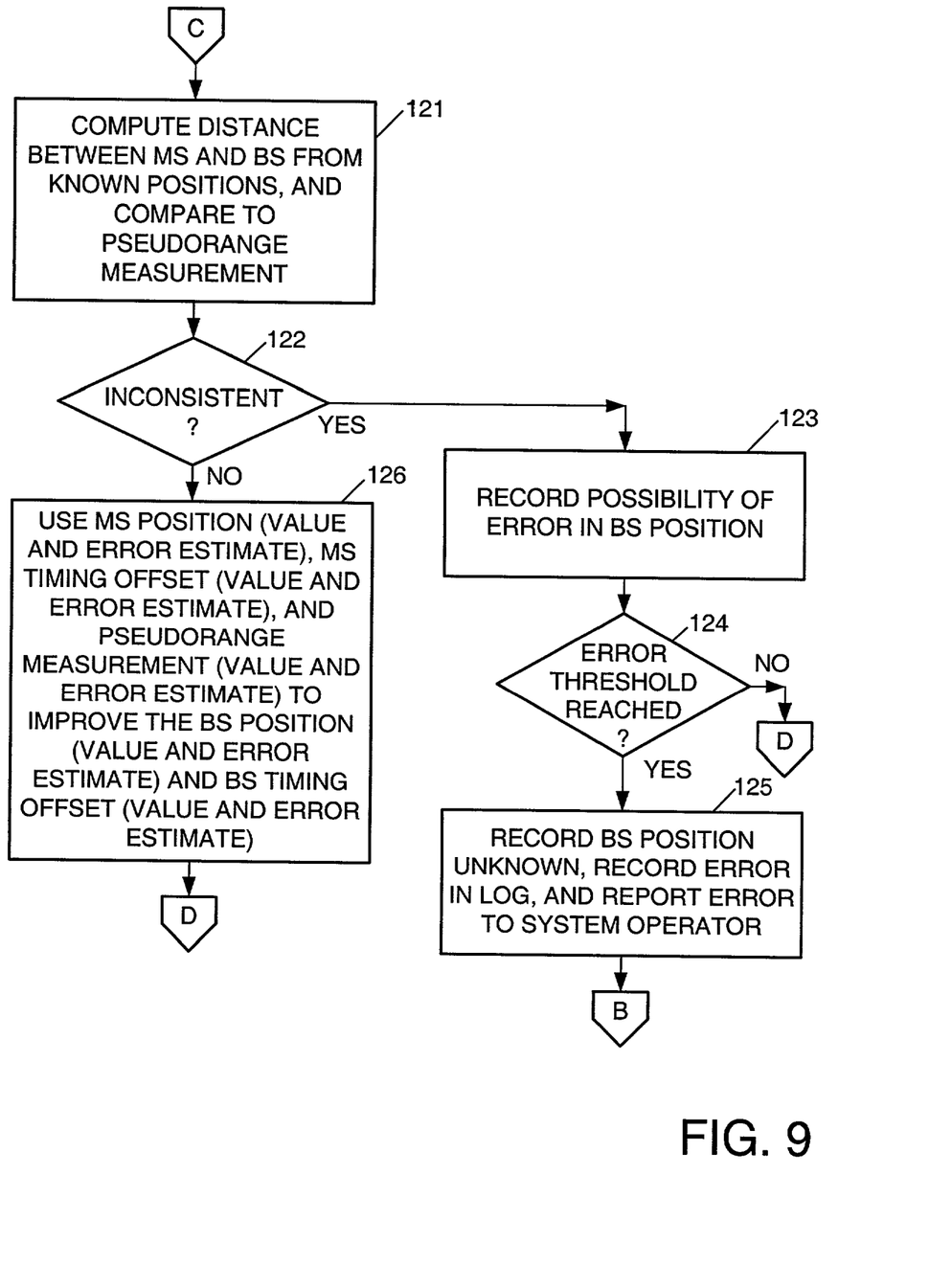

In a first step 121 of FIG. 9, the network computes the distance between the mobile station and the base station from known positions, and compare the distance to the pseudorange measurement. If the distance is inconsistent with the pseudorange measurement, taking into consideration error estimates of the distance and the pseudorange measurement, then execution branches to step 123 to record the possibility that the base station position is erroneous. If a number of such inconsistencies are recorded, then in step 124 an error threshold is reached, and execution continues to step 125 to record that the base station position is unknown, to record the error in a log, and to report the error to the system operator. Execution continues from step 125 to step 111, of FIG. 8, to possibly use mobile station position values and pseudorange measurements for determining the base station position. If the error threshold has not been reached, then execution loops back from step 124 to step 101 of FIG. 3.

In step 122, if the distance between the mobile station and the base station is consistent with the pseudorange measurement, then execution continues from step 122 to step 126. In step 126, the mobile station position (value and error estimate), mobile station timing offset (value and error estimate), and pseudorange measurement (value and error estimate) are used to improve the base station position (value and error estimate) and base station timing offset (value and error estimate). After step 126, execution loops back to step 101 of FIG. 7.

One way to improve the base station position and base station timing offset in step 126 of FIG. 9 is to keep a log of the measurements pertinent to the base station position and timing offset, and to recompute the base station position based on all of the measurements in the log. When the number of measurements becomes large, however, the computation time and storage may become excessive. At this point, the base station position and timing offset can be computed using only a certain number of the most recent measurements. In addition, it is possible to use a filter, such as a Kalman filter, in order to improve continuously the value of the base station position and timing offset. In a simple example, the most recent measurements produce an estimated position ($P_e$), and the new position ($P_{new}$) is computed as a weighted average of the old position ($P_{old}$) and the estimated position ($P_e$) as follows:

$$P_{new} = \alpha(P_e) + (1-\alpha)(P_{old})$$

where $\alpha$ is a weighting factor less than one. The weighting factor is chosen based on the respective number of measurements (N) and the respective average of the relative error (E) of the measurements contributing to the old value and the estimated value, for example, according to:

$$\alpha = (N_e/E_e)/(N_e/E_e + N_{old}/E_{old})$$

A filter can also be used in a similar fashion to compute a new value for the base station timing offset from the old value and a new estimate, but in this case it is advantageous to estimate drift of the timing offset over time. In other words, the base station timing offset ($T_{off}$) is modeled as a linear function of time (t); $T_{off} = \beta t + T_o$. From a series of measurements over time, the parameters $\beta$ and $T_o$ are estimated by the method of least squares. When the number of measurements in the series becomes excessive, only a reasonable number of the most recent measurements are retained in the log and used to produce an estimated value for $\beta$ and an estimated value for $T_o$. A new value for $\beta$ is computed from the estimated value of $\beta$ and the old value of $\beta$, and a new value for $T_o$ is computed from the estimated value of $T_o$ and the old value of $T_o$.

Figure 10:
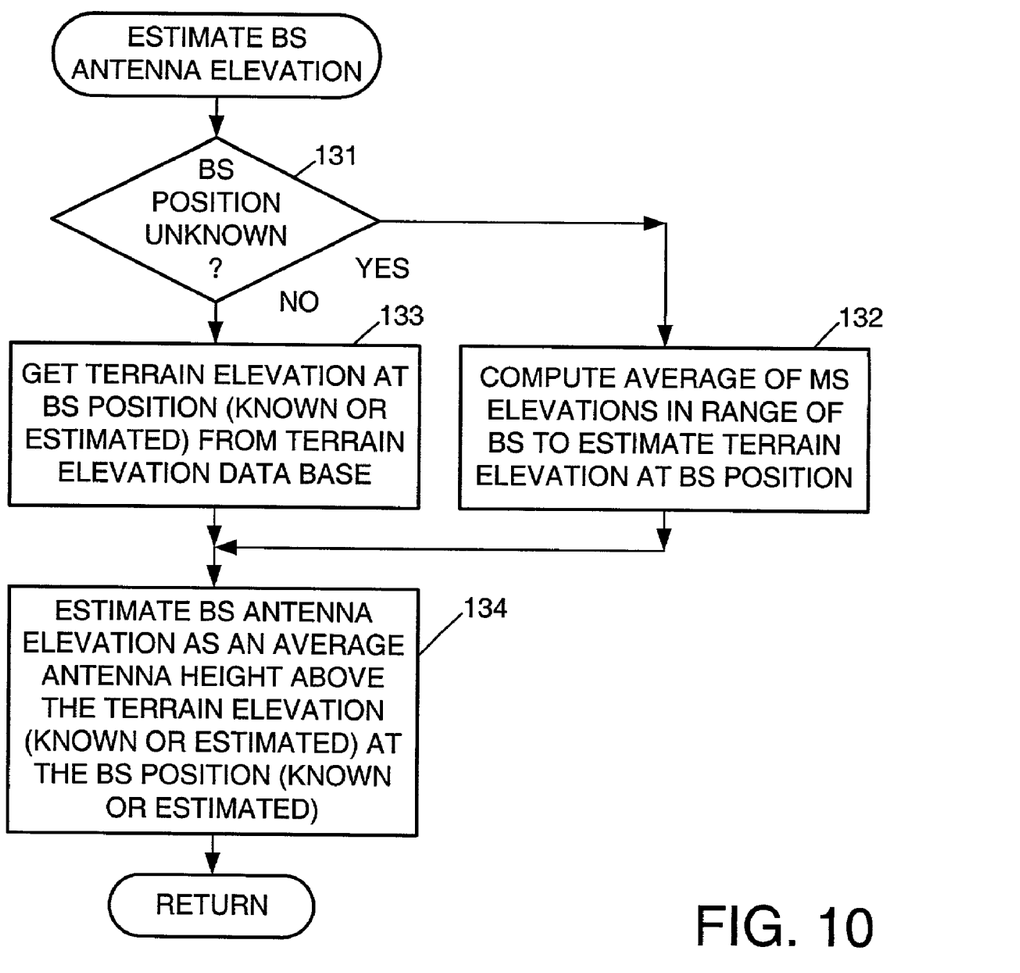
FIG. 10 is a flow chart of a routine for estimating the elevation of a base station antenna.

FIG. 10 shows a flow chart of a routine for estimating a base station antenna elevation. In a first step 131, if the base station antenna position (latitude and longitude) is unknown, then execution branches to step 132. In step 132, the terrain elevation at the base station position is estimated by computing the average of the elevations of the mobile stations in communication range of the base station, and execution continues to step 134. In step 121, if the base station position is known, then execution continues to step 133. In step 133, a terrain elevation data base is accessed to obtain the terrain elevation at the base station position (known or estimated). In step 134, the base station antenna elevation is estimated as an average antenna height (such as ten feet) above the terrain elevation (known or estimated) at the base station position, and execution returns.

In view of the above, there has been described a wireless telecommunication network. Base station antenna positions and base station time offsets are stored in a base station almanac data base along with other information used for obtaining the most reliable mobile station position fixes under a variety of conditions. An automatic system is provided for creating, updating, and maintaining the base station almanac data base. In general, the automatic system uses mobile station position fixes to give context to terrestrial ranging information and other measurements taken by the cellular handset. The system also uses the position fixes to maintain an understanding of cellular performance and to provide performance feedback to cellular operators and customers. The automatic system detects incomplete or inaccurate information, and then makes automatic fixes and/or advises a system operator. In particular, the system uses the position fixes of mobile stations and terrestrial ranging information to determine base station antenna positions and base station timing offsets. Therefore it is possible to obtain automatically base station location data when the location data is unknown, without any additional network hardware or any change in the communication protocols. The base station antenna positions can be determined continuously during normal mobile station position determinations, in order to maintain and improve the antenna location data, and to correct for change or relocation of the base station antennas. In this fashion, it is possible to recover quickly from a loss of cell sector identity during relocation of a base station antenna, and to ensure accuracy of mobile station position determination based on ranging from the base stations, and rapid acquisition of position data from mobile stations having global satellite receivers.

The invention claimed is:

1. In a wireless communication network having base stations for communication with mobile stations, a base station almanac, and a position determining entity for determining the positions of the mobile stations from signals transmitted between the base stations and the mobile stations, a method of maintaining base station location information in the base station almanac, the method comprising:
   (a) when the position of a mobile station is determined by the position determining entity independent of the position of a base station in communication range of the mobile station, determining the distance between the base station and the mobile station from signals transmitted between the base station and the mobile station; and
   (b) modifying the base station almanac to include corrected base station location information for the base station when the distance between the base station and the mobile station indicates that the base station location information in the base station almanac is incorrect or relatively inaccurate.

2. The method as claimed in claim 1, wherein the position of the mobile station is determined by the position determining entity when the mobile station receives a base station signal from a base station absent from the base station almanac 3. The method as claimed in claim 1, which includes determining the position of the base station from positions of a plurality of the mobile stations and signals transmitted between the base station and the plurality of the mobile stations, and modifying the base station almanac by storing the determined position of the base station in the base station almanac.

4. A wireless communication network comprising:
   (a) base stations for communication with mobile stations; and
   (b) at least one position determining entity for determining positions of the mobile stations based on signals transmitted between the base stations and the mobile stations, and information stored in a base station almanac;

wherein the wireless communication network is programed for determining the position of a base station from the positions of the mobile stations and from signals transmitted between the base station and the mobile stations, and for using the determined position of the base station to maintain base station location information in the base station almanac.

5. The wireless communication network as claimed in claim 4, wherein the position of the base station is determined when a mobile station receives a signal from the base station and the base station is found to be absent from the base station almanac.

6. The wireless communication network as claimed in claim 4, wherein the base station almanac is updated with the determined position of the base station when the determined position of the base station indicates that base station location information in the base station almanac indicates an incorrect position for the base station.

7. The wireless communication network as claimed in claim 4, wherein the mobile stations have global satellite receivers, and the position determining entity determines the positions of the mobile stations from signals received by the mobile stations from global satellites.

8. The wireless communication network as claimed in claim 4, wherein the position determining entity determines the positions of the mobile stations by Advanced Forward Link Trilateration (AFLT) of each mobile station from base stations having known positions.

9. The wireless communication network as claimed in claim 4, wherein the position determining entity measures path delays of the signals transmitted between the base station and the mobile stations to determine distances between the base station and the mobile stations, and determines the position of the base station front the positions of the mobile stations and the distances between the base station and the mobile station.

10. The wireless communication network as claimed in claim 4, wherein the position determining entity computes a dine bias in the base station transmitter from the position of the mobile stations and from the signals transmitted between the base station and the mobile stations.

11. The wireless communication network as claimed in claim 4, wherein the position determining entity estimates antenna elevation of the base station as an average antenna height above an average elevation of the mobile stations.

12. The wireless communication network as claimed in claim 4, wherein the position determining entity estimates antenna elevation of the base station as an average antenna height above an elevation obtained by look-up of a terrain elevation database for the elevation at an estimated position of the base station.

* * * * *